3,368,992
PROCESS OF DISPERSING A FIBER-FORMING POLYAMIDE AND PIGMENTS IN A DISPERSING MEDIUM
Hans Altermatt, Basel, Switzerland, assignor to Ciba Limited, Basel, Switzerland
No Drawing. Filed Aug. 7, 1959, Ser. No. 832,169
Claims priority, application Switzerland, Aug. 12, 1958, 62,825/58
2 Claims. (Cl. 260—29.2)

Fibers of regenerated cellulose can be spin-dyed in a relatively simple manner by adding an aqueous suspension of a pigment to a viscose or cuprammonium solution of cellulose which is also aqueous. However, in the case of polyamide fibers there is the serious difficulty that it is not permissible in the spinning operation to introduce into the spinning solution or spinning melt any foreign substance other than the dyestuff or pigment necessary for coloring the fibers. There is also the difficulty that it would be desirable to be able to add the coloring matter very shortly before the spinning operation so that a change from one color to another could be made without too much operational disturbance.

For adding the coloring matter (the term "color" being used to include black and grey) preparations are desirable which contain as a carrier the same fiber-forming substance as that from which the polyamide fibers are to be made, but which preparations contain a relatively large amount of dyestuff, advantageously in a finely divided to colloidal form.

Methods are known that enable such preparations to be made. However, these methods required the use of complicated and not very efficient apparatus, such as kneading apparatus or a roller mill, in order to bring about the essential fine dispersion of the dyestuff in the spinning mass.

The present invention provides a process for the manufacture of preparations of solid substances which are suitable for the spin-dyeing of fibre-forming polyamides, wherein a polyamide is heated in a closed vessel at a temperature above 100° C. with a dispersion of a pigment in the presence of a liquid which does not dissolve the polyamide at temperatures below 100° C. but does dissolve it at temperatures above 100° C., the heating being continued until the polyamide has dissolved, and the resulting mixture is then cooled.

As fiber-forming polyamides there are used polyamides such, for example, as those obtained from ε-caprolactam (commercially known as Perlon), or from ω-aminoundecanoic acid (commercially known as Rilsan) or from hexamethylene diamine and adipic acid (commercially known as nylon) or from analogous starting materials. There may also be used mixed polyamides, for example, those obtained from ε-caprolactam and those from hexamethylene diamine and adipic acid. The polyamides are advantageously used in a disintegrated form as so-called chippings.

As pigments there may be used either inorganic pigments such, for example, as carbon black, titanium dioxide, cadmium yellow, mercadmium yellow, iron oxides, chromium oxide, or organic pigments such, for example, as copper phthalocyanine, highly chlorinated copper phthalocyanines, anthraquinone pigments or azo- and dioxazine-dyestuff pigments, and also colored hydrocarbons such, for example, as rubicene, or colorless pigments that absorb ultra-violet light, for example, optical brightening agents. It is of advantage to use these pigments in a finely dispersed form.

In the process of this invention the polyamide is heated with a dispersion of a pigment in a liquid which is incapable of dissolving the polyamide at a temperature below 100° C. but is capable of dissolving it at a temperature above 100° C. As suitable liquids there may be mentioned, more especially, water, a or a water-soluble alcohol, a ketone, a lactone, or a base, amide, or sulfoxide, and advantageously a liquid containing at most 5 carbon atoms, for example, γ-butyrolactone, dimethyl-formamide, dimethyl sulfoxide or pyridine. Mixtures of different liquids of the aforesaid kind may be used. There is advantageously used at least one part of the liquid for every part of the polyamide.

There are advantageously used dispersions of pigments in one of the liquids of the above kind. Aqueous dispersions of pigments can be made by a very wide variety of known methods, so that there is generally no special difficulty in attaining the degree of fine particle size finally required for spin dyeing, for example, by grinding the pigment in an aqueous medium with a dispersing agent in a vibratory mill or colloid mill or the like. In some cases it is possible to precipitate the pigment in a very finely dispersed form, and then it is only necessary to take care that the original state of fineness is not subsequently lost by agglomeration. Dispersion of pigments in organic solvents especially dimethyl-formamide, are advantageously obtained by grinding the crude pigment in the solvent.

In certain cases it may be of advantage to carry out the process of this invention in the presence of a small proportion of an addition, for example, a dispersing agent, for example, the sodium or potassium salt of dinaphthylmethane disulfonic acid.

The polyamide and the pigment dispersion are heated together in the liquid in a closed vessel. As most polyamides are sensitive to oxygen it is desirable to work with the exclusion of oxygen. This is advantageously accomplished by displacing the air present in the pressure vessel by nitrogen or water vapor or vapor of the solvent. Depending on the liquid used the mixture is heated to a temperature within the range of 100° C. to 200° C., and advantageously 160° C. to 185° C. In a short time the polyamide completely dissolves. After cooling the mixture the polyamide and the pigment precipitate out in a finely dispersed form. It is surprising that the pigment is now dispersed in the polyamide particles in the same fine state of dispersion as it was when dispersed in the liquid. The polyamide particles can easily be separated from the reaction liquid by filtration.

The filter residue so obtained is advantageously washed in order to remove soluble constituents, for example, a dispersing agent. During the drying of the product care should be taken that the pigment polyamide particles do not fuse together.

Thus, preparations of solid substances are made in a simple manner by the process of this invention. The ratio of pigment to polyamide used in making the preparations may vary within wide limits. For reasons of economy 100 parts of the preparation may contain more than 10 parts of pigment. If too high a proportion of pigment is used the uniform and fine dispersion of the pigment may be lost. Accordingly, a proportion of pigment exceeding 60% can hardly be used. Good preparations are generally obtained with a proportion of dyestuff or pigment amounting to about 15–40%.

The preparations of this invention advantageously consists substantially only of the polyamide and the pigment, since any additions or solvents have to be removed completely or to a considerable extent before the preparations are used. The preparations are suitable, as stated above, principally for the spin-dyeing of polyamides or other artificial fibers, such as polyester fibers, for which purpose they can be used without further treatment, since they are in the appropriate state of fine subdivision. However, the preparations can also be used for other purposes, for example, for coloring lacquers, artificial resins or coating compositions.

The following examples illustrate the invention, the parts and percentages being by weight:

Example 1

100 parts of a polyamide obtained from hexamethylene diamine and adipic acid in the form of ordinary commercial chippings are heated with 300 parts of γ-butyrolactone and 350 parts of an aqueous dispersion containing 25 parts of β-copper phthalocyanine in a very fine state of dispersion and 25 parts of sodium dinaphthyl-methane sulfonate, the heating being carried out in an autoclave under nitrogen and slowly to 185° C., while stirring. After ½ hour the whole is cooled, whereupon the polyamide precipitates out and carries with it the pigment in the form of an extremely fine powder. The paste is filtered off, and washed well with water, whereby the dispersing agent is easily washed out. By drying the product there is obtained a very fine powder having a pigment content of 20%. Polyamide chippings are "breadcrumbed" with the resulting preparation, that is to say, the chippings are coated with the powder, and the chippings so treated are spun in the usual manner from a melt. At a coloring strength of 1% in relation to pigment, the pigment is uniformly distributed throughout the polyamide filaments and is present therein in the same state of fineness as it was in the aqueous dispersion.

A preparation having similar properties is obtained by using a polyamide obtained from ε-caprolactam or from ω-amino-undecanoic acid.

Example 2

100 parts of polyamide chippings obtained from hexamethylene diamine and adipic acid, 250 parts of dimethyl-formamide or dimethyl sulfoxide and 250 parts of an aqueous pigment dispersion containing 25 parts of β-copper phthalocyanine in a very fine state of dispersion and 25 parts of sodium dinaphthyl-methane disulfonate are slowly heated to 165–170° C. under oxygen-free conditions in an autoclave having stirring means. After one hour the whole is allowed to cool, whereupon the polyamide precipitates out and carries with it the pigment in the form of a fine powder, which is worked up in the manner described in Example 1.

Example 3

75 parts of polyamide chippings obtained from ε-caprolactam and 450 parts of an aqueous dispersion containing 25 parts of β-copper phthalocyanine in a very fine state of dispersion and 25 parts of sodium dinaphthyl-methane disulfonate are slowly brought to 160° C. with the exclusion of oxygen in an autoclave having stirring means. After one hour, the whole is cooled and the colored granulate so obtained is ground and thoroughly washed. By drying it there is obtained a uniformly colored powder having a pigment content of 25%.

A polyamide obtained from ω-amino-undecanoic acid can be used with equal success, instead of the polyamide obtained from ε-caprolactam.

Instead of β-copper phthalocyanine, there can be used with the same success the following pigments: chlorinated copper phthalocyanine, dipyrazole-anthronyl, linear quinacridone, cadmium yellow, carbon black, titanium dioxide, the pigment of the formula

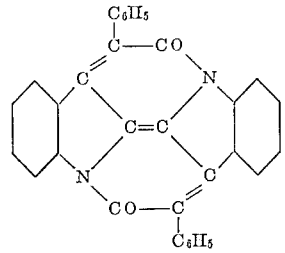

or the colored hydrocarbon rubicene or periflanthene.

Example 4

100 parts of polyamide chippings obtained from hexamethylene diamine and adipic acid, 250 parts of water and 275 parts of a suspension of 25 parts of β-copper phthalocyanine in a very fine state of dispersion in 250 parts of acetone are slowly heated to 165–170° C. with the exclusion of oxygen in an autoclave fitted with stirring means. After one hour the whole is allowed to cool, and the previously dissolved polyamide precipitates out in a fine state and carries the pigment with it. The powder is filtered off and dried.

Example 5

75 parts of polyamide chippings obtained from hexamethylene diamine and adipic acid and 225 parts of an aqueous suspension containing 25 parts of β-copper phthalocyanine in a very fine state of dispersion and 25 parts of sodium dinaphthyl-methane disulfonate and 175 parts of pyridine are heated at 165–170° C. in a stirring autoclave with the exclusion of atmospheric oxygen. After cooling the mixture there is obtained an extremely fine powder. The latter is filtered off and washed free from pyridine and dispersing agent. By drying the product there is obtained a uniformly blue preparation having a pigment content of 25%.

Example 6

75 parts of polyamide chippings obtained from hexamethylene diamine and adipic acid and 450 parts of a suspension containing 425 parts of dimethyl-formamide and 25 parts of β-copper phthalocyanine in a very fine state of dispersion are slowly heated to 200° C. in a stirring autoclave with the exclusion of oxygen. After one hour, the whole is cooled, whereupon the polyamide precipitates out and carries with it the pigment in the form of a fine powder. The preparation is worked up as described in Example 1 and then has a pigment content of 25%.

Instead of indanthrone there may be used with similarly good results the dyestuffs of the formulae

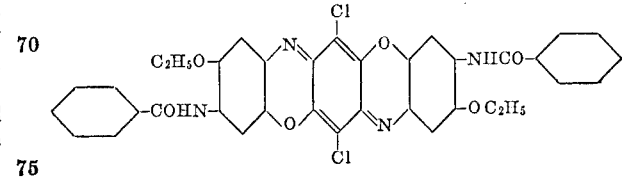

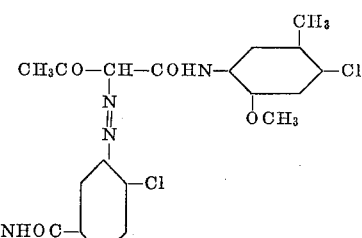

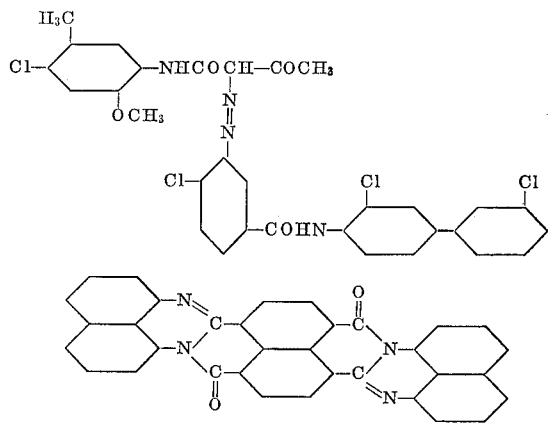

or nigrosine black bases.

What is claimed is:

1. A process for producing preparations of solid substances, comprising heating fiber-forming polyamide in a closed vessel at a temperature within the range of about 100–200° C. with a dispersion of a pigment in the presence of a liquid selected from the group consisting of water, formamide, γ-butyro-lactone, pyridine and dimethyl-sulfoxide, with the exclusion of oxygen, until the polyamide has dissolved, and cooling the resulting mixture, at least 1 part by weight of pigment being used for every 10 parts by weight of polyamide.

2. A process as claimed in claim 1, wherein the said temperature is within the range of 160° C. to 185° C.

References Cited

UNITED STATES PATENTS 2,345,533  3/1944  Graves _____ 260—37
2,849,414  8/1958  Stott _____ 260—37

OTHER REFERENCES

Floyd, Polyamide Resins, Reinhold Pub. Co., New York, 1958, pp. 13, 14, 18.

MORRIS LIEBMAN, *Primary Examiner.*

DAN ARNOLD, *Examiner.*

H. L. SATZ, G. C. HONEYCUTT, A. D. SULLIVAN, A. H. BRODMERKEL, *Assistant Examiners.*